May 28, 1963 M. W. WIDENER 3,091,410

TAPE TENSIONING DEVICE

Filed March 1, 1961 3 Sheets-Sheet 1

MAURICE W. WIDENER
INVENTOR.

BY Robert G. Clay

ATTORNEY

May 28, 1963 M. W. WIDENER 3,091,410

TAPE TENSIONING DEVICE

Filed March 1, 1961 3 Sheets-Sheet 2

MAURICE W. WIDENER
INVENTOR

BY Robert G. Clay

ATTORNEY

May 28, 1963 M. W. WIDENER 3,091,410

TAPE TENSIONING DEVICE

Filed March 1, 1961 3 Sheets-Sheet 3

MAURICE W. WIDENER
INVENTOR.

BY Robert S. Clay

ATTORNEY

United States Patent Office 3,091,410
Patented May 28, 1963

3,091,410
TAPE TENSIONING DEVICE

Maurice W. Widener, San Jose, Calif., assignor to Ampex Corporation, Redwood City, Calif., a corporation of California Filed Mar. 1, 1961, Ser. No. 92,567
9 Claims. (Cl. 242—55.12)

This invention relates to tape transports and particularly to transports adapted for maintaining constant tension in a tape that is being transported.

In magnetic tape recorder transports, wherein a tape is moved under tension from one reel and past a number of transducers to another reel, it is desirable to maintain the tape tension at a constant value so that the resulting elongation of the tape is constant. Otherwise the wave lengths of the recorded signal on different portions of the tape are unpredictably elongated as they are presented to the transducers, and undesirable pitch variations, known in the audio recording art as "flutter" and "wow," occur. Also, slippage may occur between the tape and capstan so as to cause unpredictable variations in the speed of the tape at the transducers with the same undesirable effects. In certain types of transports, the rotational speed of the capstan itself may be changed in response to variations in the tape tension. The same phenomena in computer tape recorders produce analogous undesirable effects.

In all but the most elementary recorders, the tape is pulled from the supply reel by a capstan and pinch roller assembly, which rotates at a constant velocity and which tightly pinches the tape so as to exert an unvarying pulling effect. The supply reel is held back by some form of braking means so as to drag on the tape in a direction opposite to the direction of pull of the capstan, thus providing the required tape tension. But the braking means usually exerts a constant hold-back torque on the supply reel, and this torque causes a tension on the tape that is inversely proportional to the radius of tape actually remaining coiled on the reel. Thus, a changing pull is exerted on the tape, the force of this pull varying as an inverse function of the tape radius. In effect, then, with such an arrangement the tension of the tape must vary as an inverse function of tape radius on the supply reel and cannot be held constant.

Accordingly, it is an object of the present invention to provide an apparatus for maintaining the tension of a tape at a constant value while the tape is being unwound from a supply reel.

It is another object of the invention to provide an apparatus for braking a supply reel in motion so that the braking force varies as a function of the radius of the tape coil on the reel.

It is still another object of the invention to provide an apparatus as above described and also adapted to maintain constant tension in the tape against the influence of forces tending to transiently vary the tension.

It is a further object of the invention to provide an apparatus as above described and adapted to vary the braking force as an inverse function of forces tending to increase or decrease the tape tension.

These and other objects are accomplished by the structure of the invention, in which there is provided a tension arm over an end of which is passed the tape coming off the reel, so that the tension arm receives a component of the tape tension varying as a function of the radius of the tape coil. The tension arm is coupled to the braking means so as to relieve the braking force as a function of the tension component received. The tension arm is also arranged so that transitory variations in the tape tension, such as would result upon plucking of the extended tape, cause the tension arm to immediately compensate by appropriate variation of the braking force. Thus, the tension is maintained substantially constant despite unwinding of the reel and despite the action of transitory variation forces.

The invention will be described in greater detail in conjunction with the accompanying drawing, in which.

Figure 1:
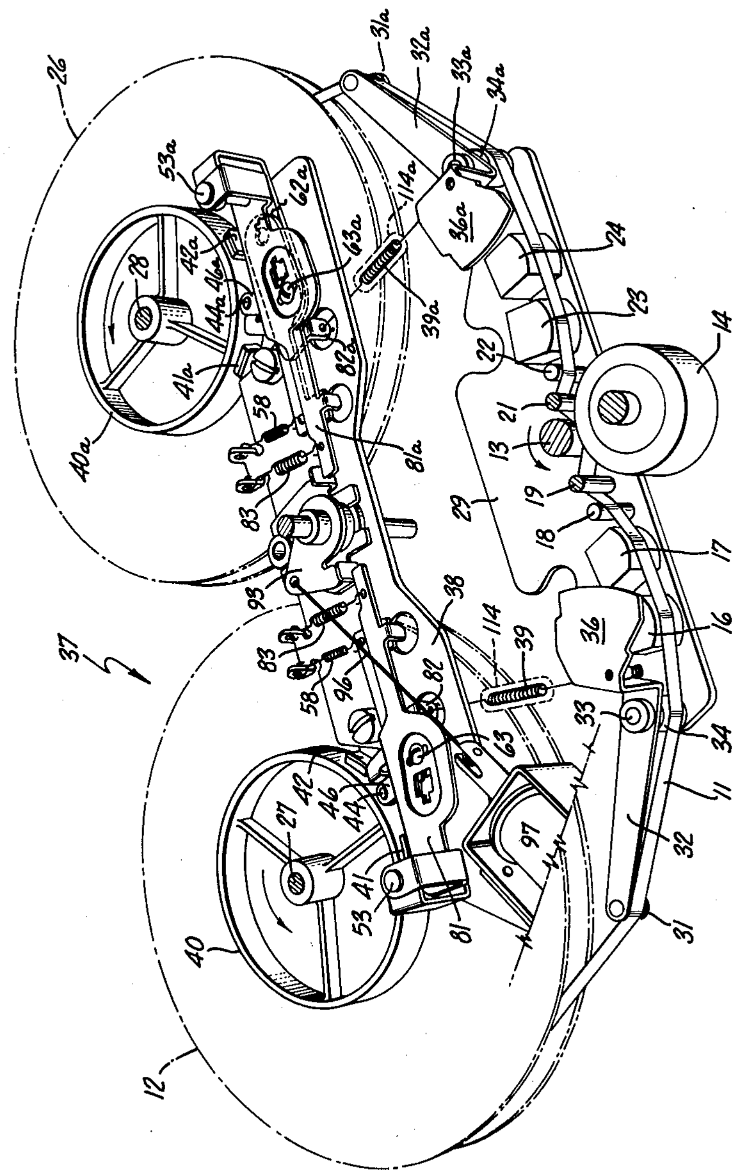
FIGURE 1 is a perspective view of a tensioning device constructed in accordance with the invention.

Referring now to FIGURE 1 there is shown a portion of a magnetic tape transport, including the apparatus of the invention, for moving a magnetic tape 11. The tape 11 is coiled on a supply reel 12 and is pulled off the supply reel by means of a capstan 13 and pinch roller 14, engaging in passage a pair of transducing heads 16 and 17 and a pair of guide posts 18 and 19. After passing the capstan 13, the tape passes between another pair of guide posts 21 and 22 and engages another pair of transducers 23 and 24 before being coiled upon a takeup reel 26 which is driven by a motor (not shown). It will be noted that the view of FIGURE 1 is taken from the back side of the tape transport housing cover plate (not shown), and that the tape 11 and the reels 12 and 26, the transducers 16, 17, 23 and 24, the posts 18, 19, 21 and 22, and the capstan 13 and pinch roller 14 all project exteriorally of the transport cover plate so as to be accessible from the exterior of the housing; but for clarity in the drawing, the cover plate is not shown. The reels 12 and 26 are mounted on shafts 27 and 28 extending to the interior of the transport housing; and the transducers, posts and capstan are all mounted solidly or rotatably on mountings forming part of the transport, being additionally covered for protection with a protection plate 29 mounted on the exterior of the housing.

The tape 11 coming off the supply reel 12 passes over a guide element 31 mounted at the extended end of an arm 32, which is pivoted as by a pin 33 to the head mounting plate 29. A guide element 34 is mounted on the pin 33 between the arm 32 and the plate 29, and the tape passes from the guide 31 over the guide 34 and thence to the transducer 16. The arm 32 is, thus, also positioned on the exterior side of the transport housing cover plate, but has an angled extension portion 36 extending beneath the cover plate for coupling with a reel brake mechanism 37 mounted on a base plate 38, which is secured to the interior side of the housing cover plate. The coupling is effected, as by means of a resilient tension member 39, as will later be described. The brake mechanism 37 also includes a brake drum 40 mounted on the shaft 27 for rotation with the reel 12, and a pair of brake shoes 41 and 42 (best seen in FIGURE 2) engaging the drum 40.

While the tensioning apparatus of the invention is meant to operate mainly with a supply reel, the transport shown in the drawing is one that is designed for processing the tape in either direction, so that under some circumstances the reel 26 operates as a supply reel while the reel 12 operates as a takeup reel. For tensioning the tape under such condition, a duplicate set of parts is provided in association with the reel 26, these parts being formed as mirror images of the parts so far described, and including as corresponding elements guide **31*a*, arm 32*a*, pin 33*a*, guide 34*a*, extension 36*a*, tension member 39, drum 40*a* and shoes 41*a* and 42*a*. The drawing figures have been broken away in different places to show best the arrangement of the parts; and for convenience, only one of each pair of duplicate parts is explicity described. But it will be understood that when, for example, the guide 31 is described, or its relation with other parts, the description holds true for the guide 31***a* and its related parts, and vice versa.

Figures 2, 3:
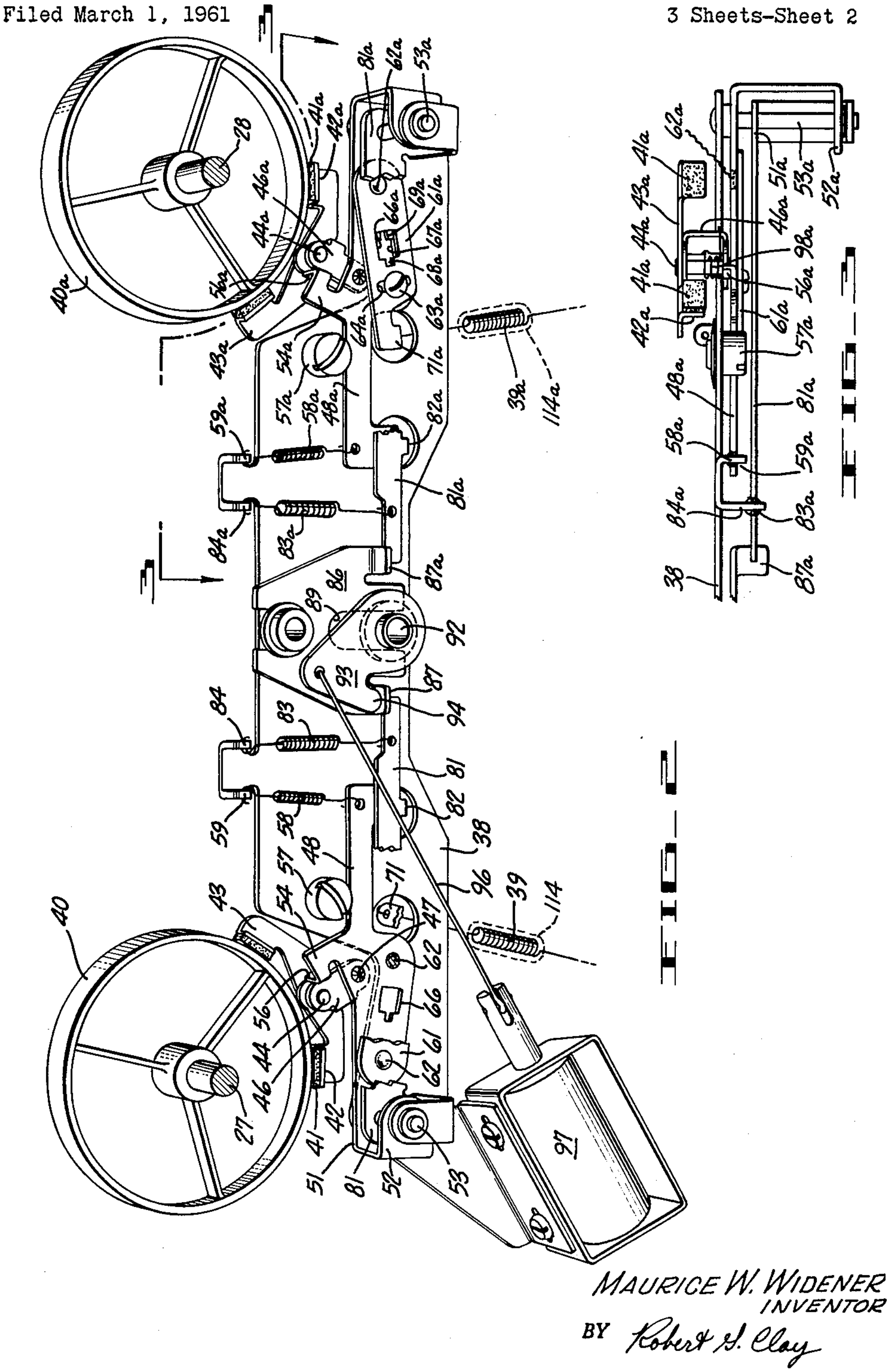
FIGURE 2 is a cut-away perspective view to an enlarged scale of a portion of the apparatus shown in FIGURE 1.
FIGURE 3 is a fragmentary cross-sectional view, taken substantially on the plane of line 3—3 of FIGURE 2.

Referring now to FIGURE 2, the shoes 41 and 42 are shown as frictional pads mounted at the ends of a bracket 43, which is pivoted, as by a pin 44, at its midpoint to the end of a link member 46, the bracket being formed so that the tangents to the drum 40 at the points of contact of the shoes 41 and 42 with the drum pass through the axis of the pin 44, so as to insure that the frictional forces applied by the shoes to the drum will be equally distributed between the two shoes. The link member 46 is pivoted at its other end by a pin 47 to an extending portion of an arm 48. The arm 48 has one end re-doubled to form a pair of spaced bearing portions 51 and 52, by which the arm is pivoted as by a pin 53 to the base plate 38. The arm 48, also, has an extension portion 54 formed with a lip 56 bearing against the link member 46 near the pin 44 and on the side of the link member 46 so as to oppose motion of the link 46 and brake shoes 41 and 42 in the direction of rotation of the adjacent portion of the drum 40 when the reel 12 is operating as a supply reel. A spring 98*a* (FIGURE 3) to be described hereinafter connects the link member 46 and the arm 48 in such a way as to urge the link 46 against the lip 56 of the extension 54. Thus, it will be seen that when drum 40 is rotating as part of a supply reel (counter-clockwise as shown in FIGURE 2) the shoes 41—42 bear firmly against the drum 40, but when the drum is rotating as part of a takeup reel (clockwise as shown in FIGURE 2) the friction of the drum against the shoes 41—42 tends to pivot the shoes, bracket 43, and link member 46 away from the lip 56 so as to relieve the frictional engagement and permit comparatively free driving of the reel 12 as by means of a takeup-winding motor (not shown) coupled to the shaft 27. The arm 48 is limited in movement toward the drum 40 as by a projecting bolt 57, by which the plate 38 is fastened to the transport.

The arm 48 is shown coupled as by means of a tension spring 58 to an ear 59 forming part of the base plate 48. The spring 58 tends to pivot the arm 48 in such a direction to bring the shoes 41 and 42 into frictional braking engagement with the drum 40. An adjustment member 61 is pivoted at one end as by a pin 62 to the arm 48. Referring now to the right-hand side of FIGURE 2, the corresponding adjustment member 61*a* is shown, pivoted to the corresponding arm 48*a* by a pin 62*a*. The adjustment member 61*a* is adjustably secured as by means of a bolt 63*a* to the arm 48*a*, the bolt passing through an arcuate slot 64*a* and being threaded into the arm 48*a*. Thus when the bolt 63*a* is loosened, the member 61*a* and the arm 48*a* can be readjusted to various positions of relative angular adjustment, whereupon the bolt 63*a* can be tightened to secure the two members in their desired position. A pair of coincident openings 66*a* and 67*a* are provided respectively in the member 61*a* and the arm 48*a*, the openings having oppositely positioned grooves 68*a* and 69*a* formed in the sides thereof so that the tip of a screw-driver may be inserted into the grooves 68*a* and 69*a* and then twisted for setting the relative angular adjustment between the member and the arm when the bolt 63*a* is loosened. The member 61*a* has an extended portion including an ear 71*a*, to which the other end of the tension member 39*a* is coupled. Thus, it will be seen that movement of or change of pressure on the arm 32*a* causes a corresponding movement of or change of pressure on the arm 48*a*, together with a corresponding change of the value of the frictional forces applied by the shoes 41*a* and 42*a* to the drum 40*a*. The operating relationship is more clearly shown in FIGURE 3.

Also pivoted on pin 53*a* (FIGURE 2) is an arm 81*a* having an extended portion formed with an ear 82*a* engaging the arm 48*a*, the arm 81*a* being coupled as by a tension spring 83*a* to an ear 84*a* also formed on the base plate 38. Thus the arm 81*a* is disposed to urge the arm 48*a* in a direction of increased frictional bearing engagement of the shoes 41*a* and 42*a* with the drum 40*a*. The extending portions of the arms 81 and 81*a* are disposed projecting towards one another in confronting relation, and between them there is slidably mounted on base plate 38 a member 86 provided with a pair of ears 87 and 87*a* engaging the extended ends of arms 81 and 81*a*. The member 86 is formed with a pair of slots 88 and 89 transversely directed to the lengths of the arms 81 and 81*a*, and in which ride studs 91 and 92 affixed to the base plate 38. Thus as the member 86 slides downwardly as shown in the figure, riding on the studs 91 and 92, the ears 97 and 97*a* engage the arms 81 and 81*a*, forcing them against the constraint of springs 83 and 83*a* away from bearing engagement with arms 48 and 48*a*, and the force of frictional engagement of the shoes 41—42 and 41*a*—42*a* against the respective brake drums is abruptly relieved, as may be desired for "fast forward" operation of the tape transport. A link member 93 is pivoted on the stud 92 and has an extension 94 engaging the ear 87; and an extended portion of the link 93 is connected as by a tension member 96 to a solenoid 97 mounted on the base plate 38. Thus selective operation of the solenoid 97 serves to pivot link 93 and to force member 86 and the arms 81 and 81*a* in a direction of disengagement from arms 48 and 48*a*.

Referring now to FIGURE 3, the arrangement of the parts above described is further illustrated and particularly the application of the spring above referred to, here shown as a spring 98*a* coiled upon the pin 44*a* and having its ends engaging the link 46*a* and the arm 48*a*.

Figure 4:
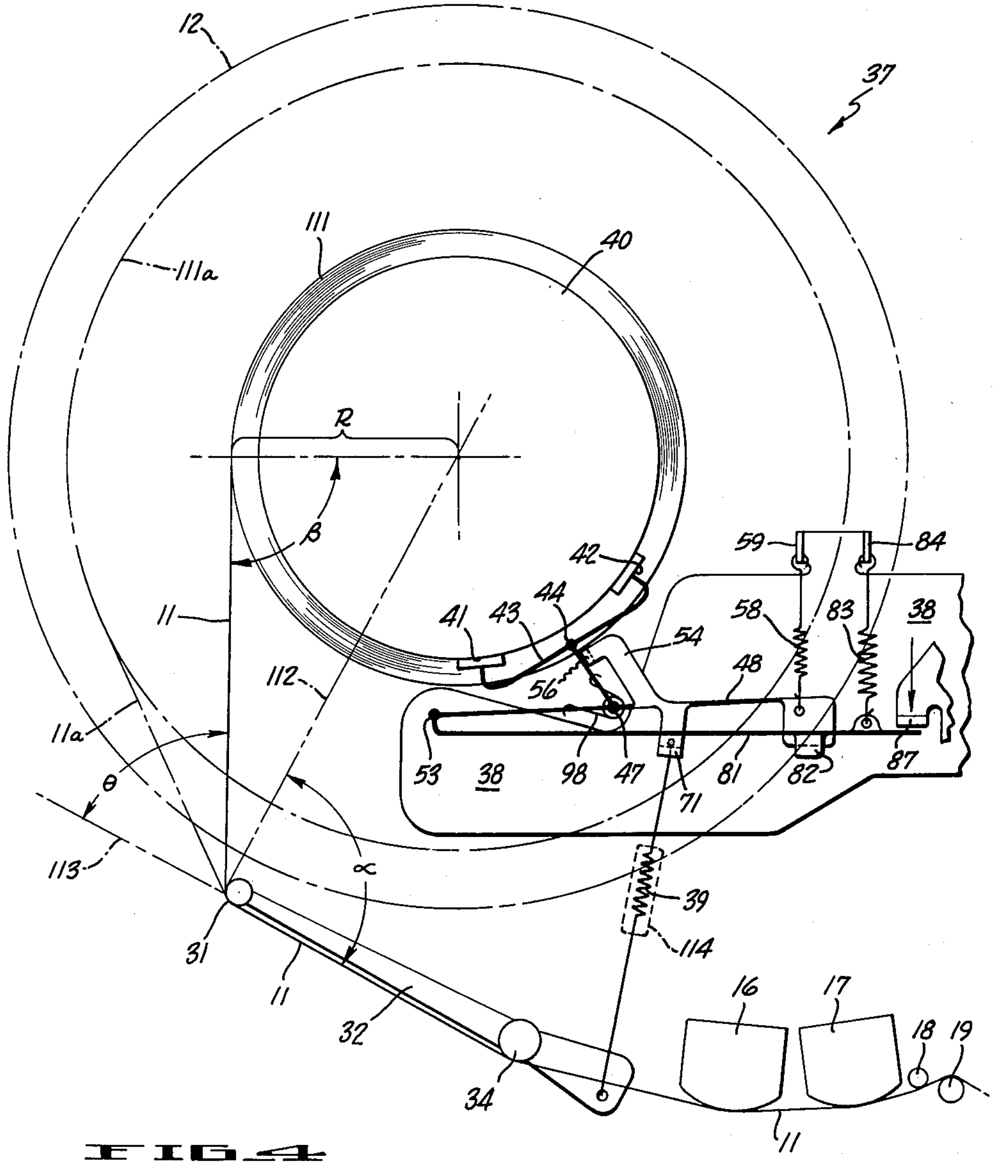
FIGURE 4 is a schematic plan view to a further enlarged scale, of portions of the apparatus shown in FIGURES 1 and 2.

Referring now to FIGURE 4, the tensioning mechanism associated with the reel 12 is shown schematically in the operation of the reel as a supply reel. The tape 11 is shown in a nearly completely unwound coil 111, but is also indicated in phantom as a tape 11*a* wound in a nearly full coil 111*a*. The arm 32 is shown positioned so that the angle $\alpha$ between the tape stretched on the guides 31 and 34 and the line 112 from the axis of the reel to the point of tangency of the tape 11 with the guide 31 is substantially a right angle; but good results are obtained in practice from the apparatus even when the angle $\alpha$ is substantially greater or smaller than a right angle. The angle $\beta$ between the tape 11 and the radius R of the coil 111 from the point of tangency of the tape 11 therewith is of course always a right angle. The angle $\theta$ between the tape 11 and a line of extension 113 of the tape stretched on the guides 31 and 34 of course varies as the tape is unwound and the radius of the coil 111 grows smaller, the angle $\theta$ growing larger meanwhile.

It will be seen that with the shoes 41 and 42 in frictional bearing engagement on the drum 40, a braking torque is applied to the drum and reel, and that this torque is maintained primarily by the action of springs 58 and 83 acting through the arms 48 and 81. The hold-back torque, acting through the moment arm represented by the radius R of the coil, causes a hold-back pull to be exerted on the tape 11 so as to tension the tape. As will be readily recognized, a portion or component of the tape tension must be transmitted to the arm 32 in such a direction as to tend to rotate the arm 32 in a clockwise direction as shown in the figure. Normally, however, the arm 32 does not actually rotate, but the component of tape tension that is applied to the guide 31 on the end of the arm is reapplied in modified value by the other end of the arm 32 acting through the resilient tension member 39 which is coupled to the arm 48 (the adjustment member 61 and the arm 48 being considered as an integral unit). This force acts in a direction opposed to the forces of the springs 58 and 83, and so as to relieve the frictional braking force of the shoes 41—42. The degree to which the braking force is relieved is of course a function of the angle $\theta$, and is in fact a function of the sine of the angle $\theta$. Thus as the coil grows smaller and the radius R decreases, the tape tension tends to increase; but concurrently the angle $\theta$ increases, the sine of $\theta$ increasing likewise, the corresponding component of the tape tension transmitted to the arm 32 increasing, and the degree to which the braking forces of shoes 41—42 is relieved also increases. Therefore the hold-back torque exerted by the shoes 41—42 is decreased as a function of the decrease of radius R, and the tape tension is maintained at a substantially constant value.

It will be seen from the figure that whenever sudden, unpredictable, or transient variations in tape tension occur, as when the tape 11 is plucked with the fingers like the string of a violin, an increased force is applied to the arm 32 to abruptly relieve the braking effect of the shoes 41—42, and the increasing tape tension is almost instantly compensated so as to re-establish the tension at the desired constant value. If the transient variation in tension is very great, the arm 32 may in such instance actually move to some degree, but is very quickly re-established in its original position. To assist in damping the oscillations that might occur with transient tension variations, the resilient tension member 39 is formed as a tension spring enclosed in a mass 114 of sluggishly resilient material such as caulking compound.

It will be understood that the rate of increase of the sine of angle $\theta$ as the tape is unwound is very nearly the inverse of the rate of decrease of the radius R of the coil; consequently the rate of relief of the braking force applied by the shoes to the drum 40 is very nearly identical with the rate of decrease of the radius R, so that by carefully selecting the parameters of the system, such differences as may exist between these rates at various stages of the unwinding action can be held to a desired maximum value, and the tape tension can thus be controlled to be substantially constant within a desired small range of variation. With the configuration and proportions shown in the drawing, the range of variation has been found to be less than 4% of the mean tape tension.

More specifically, it has been found that by mathematical analysis, the tension can be selected to be equal at two radii of tape coil, say $R_1$ and $R_2$ and these can conveniently be selected as the largest and smallest coil radius respectively expected for a given design. The equations for static balance of the system results in an expression such as:

$$MA=\frac{R_1-R_2}{\mu R_D(Sm\theta_2-Sm\theta_1)}$$

which is a means of calculating the mechanical advantage (MA) of the lever system between pin 31 and pin 44. The terms of this equation include: $R_1$ which is the maximum radius of the tape coil; $R_2$ which is the minimum radius of the tape coil; $\mu$ which is the coefficient of friction between the brake drum 40 and the brake shoes 41, 42; $R_D$, which is the radius of the brake drum; $\theta_2$ which is the largest value of the angle $\theta$ and $\theta_1$ which is the smallest value of $\theta$. When the desired constants are selected and used in the equation, the required lever ratios can be determined and the resulting tension will be most nearly constant.

Thus there has been described a tape tensioning device in which there is provided a tension arm over an end of which is passed the tape coming off the supply reel, so that the tension arm receives a variable component of the tension depending on the tape coil diameter. The arm transmits this force in modified form to relieve the braking effect of a brake means for the reel, with the result that the braking force is decreased as the tape coil diameter decreases and the tape tension is maintained at a substantially constant value. The apparatus is also arranged to provide a varying braking force in response to transient variations in the tape tension, so as to instantly re-establish the desired tension.

What is claimed is:

1. A tape tensioning device for use with a transport of the class wherein a tape is pulled by a capstan from a supply reel, said device comprising: means mounted on said transport for pressurized frictional braking engagement with said supply reel; means coupled to said braking means for urging said braking means into said pressurized engagement with said reel; and an arm pivotably mounted on said transport and coupled to said braking means so as to relieve the pressure of said braking means on said reel when pressure is applied in a first rotational direction to said arm, said arm extending to engage said tape at a point spaced from said reel and substantially perpendicular to the radius of said reel at said point so as to receive a component of the tension of said tape with said component acting in said first rotational direction on said arm, said component being a function of the angle defined by said tape and said arm, so that said angle is changed as said tape is unwound from said reel and the restraining force applied by said braking means to said reel is progressively decreased to maintain the tension of said tape at a constant value.

2. A tape tensioning device for use with a transport of the class wherein a tape is pulled by a capstan from a supply reel, said device comprising: means mounted on said transport for pressurized frictional braking engagement with said supply reel; means coupled to said braking means for urging said braking means into said pressurized engagement with said reel; and an arm pivotably mounted on said transport and coupled to said braking means so as to relieve the pressure of said braking means on said reel when pressure is applied in a first rotational direction to said arm, said arm extending to engage said tape at a point spaced from said reel and substantially perpendicular to the radius of said reel at said point so that an acute angle defined by said tape and said arm increases as said tape is unwound from said reel and so that said arm receives a component of the tension of said tape acting in said first rotational direction, whereby said component increases as a function of the sine of said angle as said tape is unwound and the restraining force applied by said means to said reel is progressively decreased to maintain the tension of said tape at a constant value.

3. A tape tensioning device as described in claim 2, wherein said arm extends toward said point of engagement with said tape in a direction generally opposite to the direction of said tape movement in coming off said reel.

4. A tape tensioning device for use with a transport of the class wherein a tape is pulled by the capstan from a supply reel, said device comprising: a first arm pivotably mounted on said transport adjacent said supply reel; a brake shoe mounted on an extended portion of said first arm for pressurized frictional braking engagement with said supply reel; spring means coupled to said first arm and to said transport and urging said first arm to a position of pressurized frictional braking engagement of said brake shoe with said supply reel; a second arm pivotably mounted on said transport, an extended portion of said second arm being coupled to an extended portion of said first arm for relieving said pressurized frictional braking engagement of said shoe with said reel upon application of pressure to said second arm in a first rotational direction of said second arm, said second arm being provided with tape guide means at the pivot point thereof and on an extended end thereof for engaging and guiding said tape in coming off said supply reel in an unwinding direction with said extended end being substantially perpendicular to the radius of said reel at said end, said second arm being positioned so that said tape comes off said supply reel in said unwinding direction and around said guide means at said extended end of said second arm so as to define an acute angle with the line of extension of said first arm from said pivot point to said extended end and beyond, said tape then proceeding from said extended end and along the line of said second arm to and around said guide means at said pivot point so as to be stretched tautly between said guide means and along said line of said second arm therebetween, whereby as said tape is unwound from said reel, said angle and the sine thereof is increased and said extended end of said second arm is caused to receive a component of the tension of said tape with said component increasing as a function of said sine and acting upon said second arm in said first rotational direction, thereby causing said braking engagement to be relieved as a function of the decrease in radius of said tape on said reel so that the restraining moment of said brake shoe on said reel is decreased substantially linearly with the corresponding decrease of the pulling moment of said tape tension on said reel and said tension is maintained at a constant value.

5. A tape tensioning device as described in claim 4 and also including a third arm pivotably mounted on said transport, an extended portion of said third arm being disposed to engage an extended portion of said first arm and being spring loaded to additionally urge said first arm and said brake shoe into said frictional braking engagement with said reel; and a solenoid coupled to said extended portion of said third arm for withdrawing said third arm from said engagement with said first arm, whereby said solenoid may be selectively energized to cause special relief of said braking engagement for rapid unwinding of said tape from said reel.

6. A tape tensioning device as described in claim 4 wherein said supply reel is provided with a brake drum with said brake shoe engaging said drum; and wherein said brake shoe and said first arm are arranged so that the tangent to said drum at the point of engagement of said shoe therewith passes through the point around which said shoe is urged by said first arm to pivot.

7. A tape tensioning device as described in claim 6 wherein there are two brake shoes; a bracket mounting said brake shoes at extended ends thereof and having a pivot point at the midpoint thereof; a link member connecting said bracket and said first arm, with said link member being pivotably coupled at one end to said midpoint of said bracket and at the other end to said first arm; said first arm having an extending stop portion engaging said link member adjacent the connection thereof with said bracket and on the side thereof opposite to the direction of motion of the adjacent portion of said drum during unwinding of said reel; and spring means coupled to said link member and urging said link member into engagement with said extended stop portion of said first arm, whereby during unwinding of said reel said shoes are maintained in braking engagement with said drum but during rewinding of said reel said shoes, said bracket, and said link member are caused to rotate in the rewind direction of said reel to relieve the pressure of said shoes on said drum.

8. A tape tensioning device for use with a transport of the class wherein a tape is pulled by a capstan from either of two reels and is wound meanwhile on the other reel, said device comprising: a pair of brake drums on said reels; a base plate mounted on said transport between said drums; and a pair of braking means mounted at the ends of said base plate and each associated with a different one of said drums, each of said braking means including a bracket disposed generally tangent to the corresponding brake drum; a pair of brake shoes mounted at the ends of said bracket and engaging said drum; a link member pivotably coupled at one end to said bracket at a point on said bracket defined by the intersection of the tangents to said drum passing through the points of engagement of said brake shoes with said drum; a first arm pivotably mounted on said base plate and pivotably coupled to said link member at the other end thereof, said first arm having an extending stop portion engaging said link member adjacent the connection thereof with said bracket and on a side thereof opposite to the direction of unwinding rotation of the adjacent portion of said corresponding reel; first spring means coupled to said link member and urging said link member against said stop; second spring means coupled to an extended portion of said first arm and urging said first arm toward said drum to bring said shoes into pressurized frictional braking engagement with said drum; an adjustment member pivotably mounted on an extended portion of said first arm and extending generally in the same direction; clamping means connecting said adjustment member and said first arm for locking said adjustment member and said first arm together in various positions of relative angular adjustment; a second arm pivotably mounted on said transport and extending in a direction generally opposed to the unwinding direction of said drum adjacent said shoes and substantially perpendicular to the extended radius of said drum taken through the extended end of said second arm; tape guide means mounted on said second arm at said extended end thereof and at the pivot point thereof; second spring and dash pot means coupled between an extended portion of said adjustment member and the oppositely extended portion of said second arm; a third arm pivotably mounted on said base plate coaxially with said first arm and extending toward and confronting the third arm of the other braking means, said third arm being provided with an extended portion engaging the extended portion of said first arm; third spring means coupled to said base member and to an extended portion of said third arm and urging said third arm into said engagement with said first arm in the same direction as said first spring means; and means for urging said confrontng portions of said pair of third arms away from engagement with the corresponding first arms, said means including a member mounted for sliding motion on said base plate between the confronting ends of and transversely to the lengths of said pair of third arms and engaging said confronting ends of said third arms, and a solenoid mounted on said base plate and coupled to said sliding member for selectively urging said sliding member in a first direction bearing against the confronting ends of said third arms and urging said third arms out of engagement with the corresponding first arms.

9. A tape tensioning device for use with a transport of the class wherein a tape is pulled by a capstan from a supply reel, said device comprising: means mounted on said transport for pressurized frictional braking engagement with said supply reel; an arm pivotably mounted on said transport and engaging said tape with one end thereof at a point spaced from said supply reel, said arm extending in a direction substantially perpendicular to the radius of said supply reel passing through said end; said arm being provided with tape guide means at the pivot portion of said arm and at said end point of engagement with said tape and said arm being positioned to engage said tape with both of said guide means; and means coupled to said arm and braking means for varying the pressure of said braking means on said reel as a function of the angle defined by said tape and said arm, so that said angle is changed as said tape is unwound from said reel and the restraining force applied by said braking means to said reel is progressively decreased to maintain the tension of said tape at a constant value.

References Cited in the file of this patent

UNITED STATES PATENTS

| | | |
|---|---|---|
| 1,944,022 | Bundick et al. | Jan. 16, 1934 |
| 2,745,604 | Masterson | May 15, 1956 |
| 2,959,369 | House | Nov. 8, 1960 |
| 2,972,452 | Aumann | Feb. 21, 1961 |